(12) United States Patent
Suzuki et al.

(10) Patent No.: US 7,023,144 B2
(45) Date of Patent: Apr. 4, 2006

(54) DEVICE FOR OPERATION OF A HIGH PRESSURE DISCHARGE LAMP

(75) Inventors: Yoshikazu Suzuki, Yokohama (JP); Katumi Sugaya, Takasago (JP); Tomoyoshi Arimoto, Tatuno (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/989,609

(22) Filed: Nov. 17, 2004

(65) Prior Publication Data

US 2005/0206326 A1   Sep. 22, 2005

(30) Foreign Application Priority Data

Mar. 18, 2004  (JP) ............................. 2004-078790
Jul. 23, 2004   (JP) ............................. 2004-215227

(51) Int. Cl.
*H05B 37/00* (2006.01)
(52) U.S. Cl. ....................................... 315/246; 315/291
(58) Field of Classification Search ................ 315/244, 315/246, 209 R, 219, 224, 225, 291, 55–62, 315/194, 289; 313/486, 489, 491, 639
See application file for complete search history.

(56) References Cited

U.S. PATENT DOCUMENTS

| 4,705,991 | A  | * | 11/1987 | Ganser et al. ........... 315/209 R |
| 6,359,396 | B1 | * | 3/2002  | Wicklund et al. ........... 315/224 |
| 6,376,998 | B1 | * | 4/2002  | Okamoto et al. ........... 315/291 |
| 6,713,972 | B1 | * | 3/2004  | Nakagawa et al. ......... 315/291 |
| 6,888,321 | B1 | * | 5/2005  | Arimoto et al. ............ 315/289 |

* cited by examiner

*Primary Examiner*—Wilson Lee
(74) *Attorney, Agent, or Firm*—David S. Safran (57) ABSTRACT

To positionally stabilize the arc spot and to prevent the formation of so-called flicker, a super-high pressure discharge lamp which is filled with greater than or equal to 0.20 $mg/mm^3$ of mercury has a feed device which supplies an alternating current with a steady-state operating frequency of from 60 Hz to 1000 Hz and a low frequency of from 5 Hz to 50 Hz. The feed device inserts the alternating current with the low frequency into the alternating current with the steady-state operating frequency with a time interval which has a length equal to at least one half period and at most to five periods, and the time interval being in the range of from 0.1 sec to 120 sec.

6 Claims, 6 Drawing Sheets

| [1] (W) | [2] (A) | [3] | | [6] (mm) | [7] (mm) | | | | |
|---|---|---|---|---|---|---|---|---|---|
| | | [4] (mm) | [5] (mm) | | a | b | c | d | e |
| 120 | 1.7 | 9.0 | 4.2 | 1.0 | 0.3 | 6.3 | 1.0 | 0.3 | 2.0 |
| 150 | 2.1 | 9.4 | 4.4 | 1.0 | 0.3 | 6.8 | 1.2 | 0.4 | 2.0 |
| 200 | 2.9 | 10.0 | 4.4 | 1.0 | 0.4 | 7.0 | 1.5 | 0.5 | 2.4 |

[1] Power
[2] Current
[3] Dimensions of emission part
[4] External diameter
[5] Internal diameter
[6] Distance between electrodes
[7] Electrode dimensions

DEVICE FOR OPERATION OF A HIGH PRESSURE DISCHARGE LAMP

BACKGROUND OF THE INVENTION

1. Field of the Invention

The invention relates to a device for operation of a high pressure discharge lamp. The invention relates especially to an operation device which comprises:
- a superhigh pressure discharge lamp which is filled with at least 0.2 mg/mm$^3$ of mercury and in which a pressure of at least 200 atm is achieved during operation; and
- a feed device for the latter.

2. Description of Related Art

Projector devices are generally of a type using a liquid crystal cell or using a digital light processor (DLP).

The type of projector device using a liquid crystal cell includes a single sheet type and a three-sheet type. In each type, the following takes place:
- The radiant light from the light source is separated into three colors (R(ed)G(reen)B(lue)).
- The light which corresponds to the video information is transmitted and regulated by a liquid crystal cell;
- Afterwards, the three colors which have been transmitted by the cell are combined and projected onto the screen.

On the other hand, in the type of projector device using a DLP, the following takes place:
- The radiant light is emitted from the light source via a rotary filter in which RGB regions are formed by division onto a space modulation element (also called a light modulation device)—specifically a DMD element or the like by time division;
- Certain light is reflected by this DMD element (DMD—digital micro mirror device) and emitted onto a screen. Here, the expression "DMD element" is defined as an arrangement in which each pixel is covered with a few hundred million small mirrors at a time with light projection being controlled by controlling the direction of the individual small mirrors.

The DLP type, as compared to the liquid crystal type, has the advantage that the overall device can be small and simple because the optical system is simple and because it is not necessary to use as many as three liquid crystal cells.

The light source of the projector device is a high pressure discharge lamp with a high mercury vapor pressure. The reason for this is the following:

Because the mercury vapor pressure is high, light in the visible wavelength range with high intensity is obtained.

Furthermore, it is known that in such a discharge lamp with a high mercury vapor pressure, during operation, projections are formed on the electrode tips. For example, in JP patent disclosure document 2002-175890, the presence of these projections is regarded as a disadvantage and a technology is presented in which the projections are caused to disappear. Specifically, a technology is disclosed in which the frequency of rated operation maintains a lower frequency (for example, 5 Hz) of at least 1 second in which, in this way, the electrode surface is caused to melt and which is thus used to completely eliminate the projections.

Even if a high pressure discharge lamp (ultra-high pressure mercury lamp) has been operated as the light source of a projector device by the above described technology, the arc spot becomes unstable and so-called flicker occurs to a great degree. Flicker occurs especially clearly in a discharge lamp with an amount of added mercury of greater than or equal to 0.20 mg/mm$^3$.

SUMMARY OF THE INVENTION

A primary object of the present invention is to positionally stabilize the arc spot in a super-high pressure discharge lamp which is filled with at least 0.20 mg/mm$^3$ of mercury and to prevent the occurrence of so-called flicker.

The above described object is obtained by the invention in a device for operation of a high pressure discharge lamp which comprises:
- a super-high pressure discharge lamp in which, in a silica glass discharge vessel, there is a pair of opposed electrodes at a distance from one another of at most 2.0 mm and on which projections have been formed on the their tips, the vessel being filled with at least 0.20 mg/mm$^3$ of mercury and a halogen in an amount in the range of from $10^{-6}$ μmol/mm$^3$ to $10^{-2}$ μmol/mm$^3$; and
- a feed device which supplies an alternating current to this discharge vessel, is achieved in that the feed device is made to supply alternating current to the super-high pressure discharge lamp such that it comprises a steady-state operating frequency and a low frequency, the steady-state operating frequency being selected from the range from 60 Hz to 1000 Hz and the low frequency being lower than the steady-state operating frequency and from the range from 5 Hz to 50 Hz, and the feed device is further made to insert the alternating current with the low frequency into the alternating current with the steady-state operating frequency with a time interval which has a length that is at least equal to one half period and not more than five periods of the alternating current, and which is selected from the range from 0.1 sec to 120 sec, preferably from the range from 1 sec to 120 sec.

The object is furthermore advantageously achieved in that the above described feed device comprises:
- an inverter circuit which has at least two switching devices;
- a coil which is located downstream of this inverter circuit and is connected in series to the above described discharge lamp and which has a value of at most 210 μH; and
- a control element which subjects the switching devices to on or off operation in alternation, there being a dead time.

Furthermore, the object is advantageously achieved in that, for the super-high pressure discharge lamp, a trigger electrode is located on the outside of the discharge vessel.

Advantages

The following effects are achieved by the above described arrangement in accordance with the invention:

1. Projections are formed on the electrode tips, and a stable arc discharge can be formed by these projections, each acting as the starting point of the discharge. As is disclosed in JP-A-2002-175890 (U.S. Pat. No. 6,713,972 B2), it is not a technology in which projections are eliminated, but projections are actively produced. In this way, an arc is formed, these projections each acting as a discharge starting point. Therefore, there is the action that operation of the discharge lamp can be stabilized.

2. Formation of superfluous projections besides the projections which act as the arc start point can be prevented. The reason for this is the following:

If several projections are formed on the electrode tips, between these projections, a so-called arc jump is formed. As a result, the arc becomes unstable. In accordance with the invention, only projections are formed and maintained which act as the above described arc starting point, and moreover, superfluous projections besides the above described projections are prevented from forming and growing.

The invention is further described below with reference to the accompanying drawings.

DETAILED DESCRIPTION OF THE INVENTION

Figure 1:
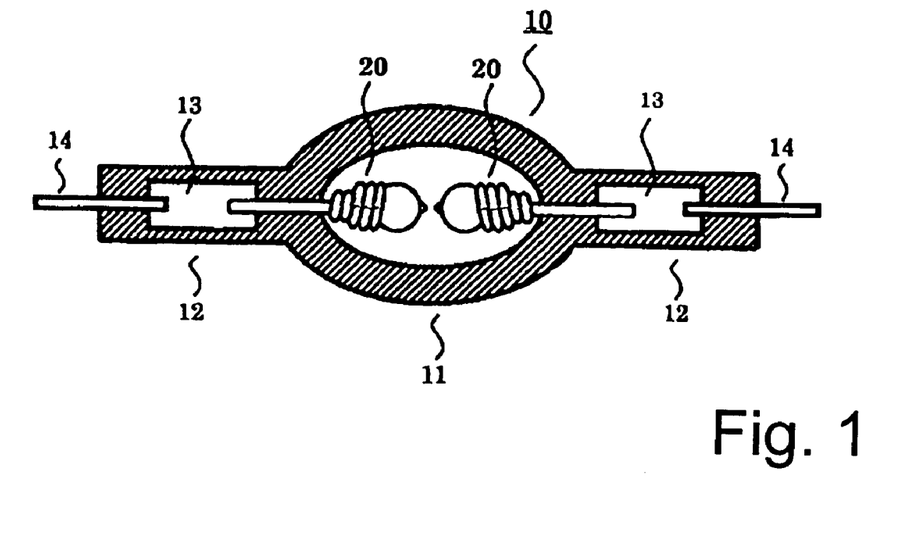
FIG. 1 is a schematic cross section of a high pressure discharge lamp in accordance with the invention.

FIG. 1 schematically shows a high pressure discharge lamp 10 of the invention that has an essentially spherical light emitting part 11 which is formed from a discharge vessel of silica glass. In this light emitting part 11, there is a pair of opposed electrodes 20 that are spaced from each other at a distance of at most 2 mm. Hermetically sealed portions 12 are formed on opposite ends of the light emitting part 11 into which a molybdenum conductive metal foil 13 is hermetically installed by a shrink seal. The support rod of the electrode 20 is connected to one end of each of the metal foil 13. An outer lead 14 is connected to the other end of the respective metal foil 13. Current is supplied by a feed device which is located outside the lamp.

The light emitting part 11 is filled with mercury, rare gas and halogen gas. The mercury is used to obtain the required wavelength of visible radiation, for example, to obtain radiant light with wavelengths of 360 nm to 780 nm, in an amount that is at least 0.2 mg/mm$^3$. At this added amount, depending on the temperature conditions, in any case, during operation a vapor pressure of at least 200 atm, therefore an extremely high vapor pressure, is achieved. By adding a larger amount of mercury, a discharge lamp can be produced with a high mercury vapor pressure during operation of at least 250 atm to 300 atm. The higher the mercury vapor pressure becomes, the more suitable the light source for a projection device which can be implemented.

Roughly 13 kPa argon gas are added as the rare gas to improve the ignitability. As the halogen, iodine, bromine, chlorine and the like in the form of a compound with mercury or another metal is added. The amount of halogen added is selected in the range from $10^{-6}$ μmol/mm$^3$ to $10^{-2}$ μmol/mm$^3$. The function of the halogen is to prolong the service life using the so-called halogen cycle. For an extremely small discharge lamp with an extremely high operating vapor pressure, like the discharge lamp of the invention, there is also the effect of preventing devitrification of the discharge vessel.

Numerical values of a discharge lamp are shown below purely by way of example.

For example:
the maximum outside diameter of the light emitting part is 9.5 mm;
the distance between the electrodes is 1.5 mm;
the inside volume of the arc tube is 75 mm$^3$;
the rated voltage is 70 V and
the rated wattage is 200 W.

The lamp is operated using an alternating current.

This discharge lamp is installed in a projector device which is to be as small as possible. Since on the one hand it is required that the overall dimensions are extremely small and since, on the other hand, there is a demand for a large emission light intensity, the thermal effect in the light emitting part is extremely strict. The value of the wall load of the lamp is 0.8 W/mm$^2$ to 2.0 W/mm$^2$, specifically 1.5 W/mm$^2$.

That the lamp has such a high mercury vapor pressure and such a high value of the wall load leads to the fact that it can offer radiant light with good color reproduction, when it is installed in a projector device or a presentation apparatus, such as an overhead projector or the like.

Figure 2:
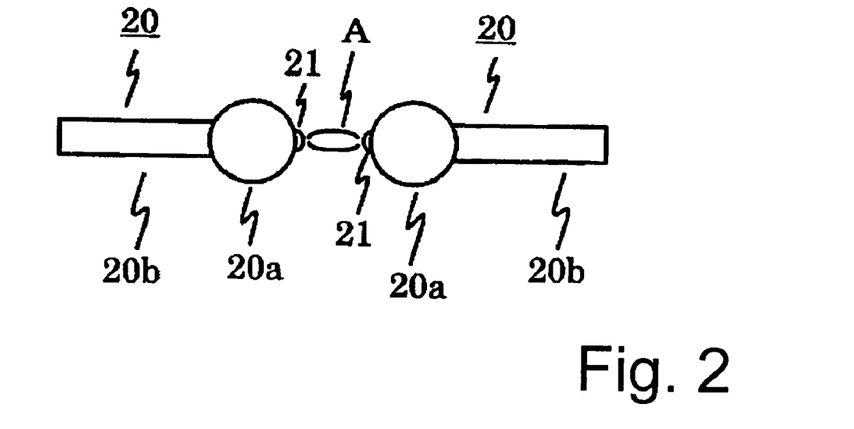
FIG. 2 is a schematic representation of an electrode of a high pressure discharge lamp of the invention.

On the tip of the respective electrode 20 (on the end which is opposite the other electrode), in the course of lamp operation, a projection is formed. This phenomenon that projections are formed is not entirely clear, but the following can be assumed.

The tungsten (electrode material) which is evaporated from the area with the high temperature in the vicinity of the electrode tip during lamp operation combines with the halogen and residual oxygen which are present in the arc tube. When the halogen is, for example, Br, it is present as a tungsten compound, such as WBr, WBr$_2$, WO, WO$_2$, WO$_2$Br, WO$_2$Br$_2$ or the like. These compounds decompose in the area with a high temperature in the gaseous phase in the vicinity of the electrode tips and become tungsten atoms or tungsten cations. By thermal diffusion (diffusion of the tungsten atoms from the area with a high temperature in the gaseous phase (arc center) in the direction to the area with a low temperature (rear of the electrode)) and because tungsten atoms are ionized in the arc, cations form, and during cathode operation, are pulled in the direction to the cathode, the tungsten vapor density in the gaseous phase in the vicinity of the electrode tip becomes high, by which precipitation takes place on the electrode tip and by which projections are formed here.

FIG. 2 schematically shows the tip of the electrode 20 which is shown in FIG. 1 in order to illustrate the electrode tip and the projection. The electrodes 20 each have a spherical part 20a and a support part 20b. A projection 21 is formed on the tip of the spherical part 20a. This projection 21 is also formed by subsequent operation, so to speak by self-formation, even in the case in which it is not present when lamp operation starts.

This projection is not formed for each discharge lamp. It is known that in a discharge lamp of the short arc type with a distance between the electrodes of at most 2 mm, in which the light emitting part is filled with at least 0.15 mg/mm$^3$ of mercury, a rare gas and halogen in the range from $1 \times 10^{-6}$ μmol/mm$^3$ to $1 \times 10^{-2}$ μmol/mm$^3$, in the course of lamp operation projections are formed.

The numerical values of the magnitude of the projection are shown by way of example below.

By way of example:
the maximum diameter of the electrode (direction which is perpendicular to the discharge direction) is 1.0 mm to 1.5 mm;
the diameter in the case of a distance between the electrodes of 1.0 mm to 1.5 mm is roughly 0.2 mm to 0.6 mm.

This projection is essential in the case in which the discharge lamp, which has a distance between the electrodes of at most 2 mm and in which in the arc tube contains at least 0.2 mg/mm$^3$ of mercury, is used as the light source of a projector device, like the discharge lamp of the invention. The reason for this is that, in a discharge lamp in which the arc tube contains at least 0.2 mg/mm$^3$ of mercury and in which the operating pressure reaches at least 200 atm, the arc discharge is highly constricted by the high vapor pressure and as a result the discharge start point is also very small.

As is disclosed in JP-A-2002-175890 (U.S. Pat. No. 6,713,972 B2), therefore, in a spherical electrode in which the projections have been eliminated, the discharge start point moves in a flickering manner; this leads to the disadvantage of flickering on the screen of the projector device. In particular, an arc spot which is formed at a short distance of at most 2 mm between the electrodes, even for little motion of up to 0.5 mm, can itself become a flicker which is fatal to the picture.

In this respect, it can be imagined that by the discharge lamp disclosed in JP-A-2002-175890 (U.S. Pat. No. 6,713,972 B2) the disadvantage of flickering could be eliminated if the action of constriction of the discharge arc and of the discharge start point is low, i.e., if the electrode has a spherical tip, since here the amount of added mercury is 0.18 mg/mm$^3$ and not greater than or equal to 0.20 mg/mm$^3$, as in the invention.

Since, in the discharge lamp of the invention, projections are formed on the electrode tips, proceeding from which an arc discharge forms, the light from the arc is shielded less by the spherical part 20a of the electrode. The degree of light utilization therefore increases. As a result, there also arises the advantage that a brighter picture is obtained. Normally, the tip of the support rod 20b has an element which corresponds to the spherical part which has a greater diameter than the support rod diameter. With respect to this aspect, reference is made to FIG. 7 which is described below.

Figure 3:
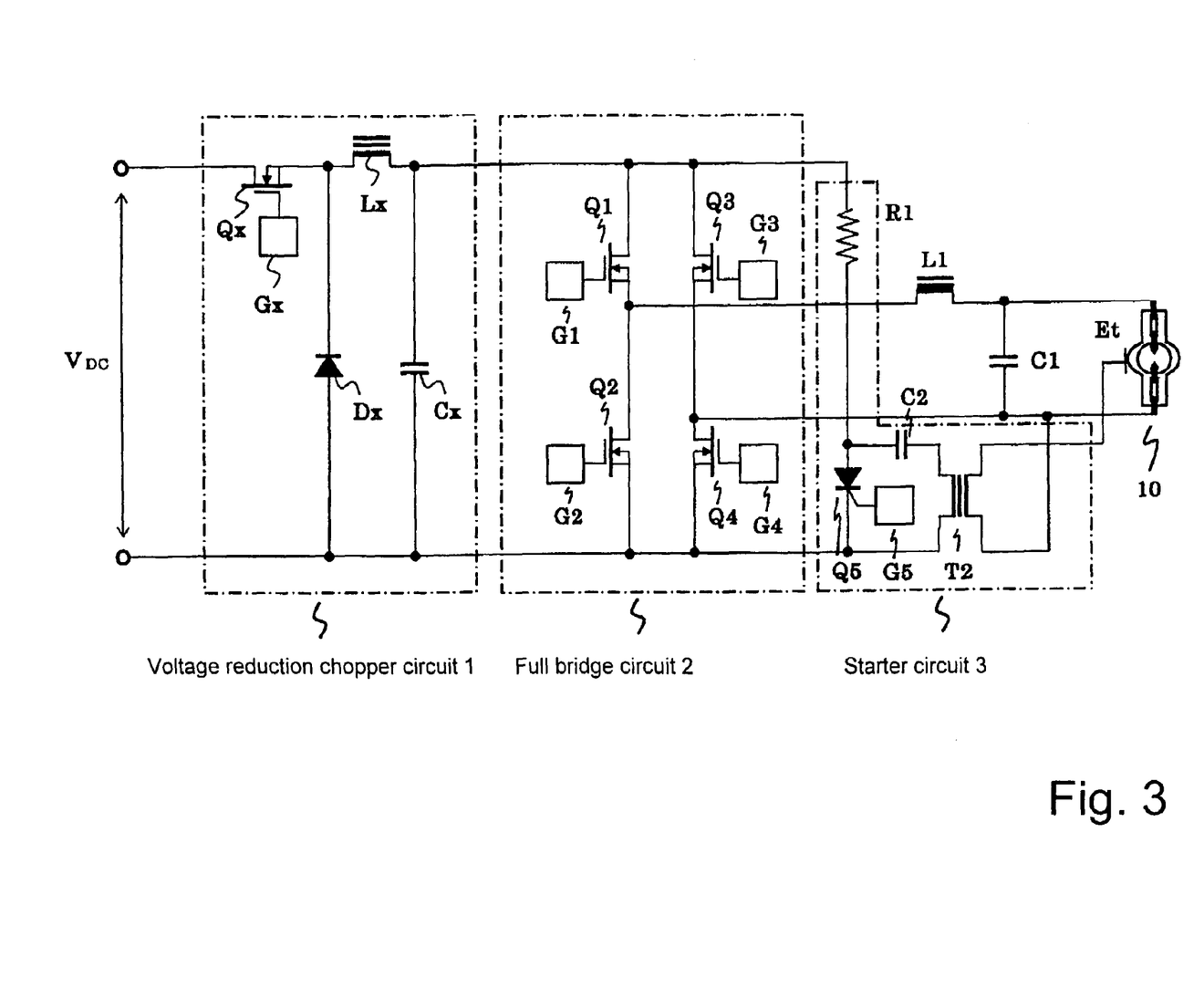
FIG. 3 shows a schematic of a feed device of a device for operation a high pressure discharge lamp in accordance with the invention.

FIG. 3 shows a feed device which operates the above described discharge lamp. The operating device has a discharge lamp 10 and a feed device. The feed device is comprised of a voltage reduction chopper circuit 1 to which a DC voltage is supplied, an inverter circuit of the full bridge type (full bridge system) 2 which is connected to the output side of the voltage reduction chopper circuit 1 and which changes the DC voltage into an AC voltage and supplies it to the discharge lamp 10 (hereinafter also called a "full bridge circuit), a coil L1 which is connected in series to the discharge lamp, a capacitor C1 and a starter circuit 3. The feed device, which together with the discharge lamp 10 is called the operating device, is formed from the voltage reduction chopper circuit 1, the full bridge circuit 2 and the starter circuit 3.

The voltage reduction chopper circuit 1 is connected to a DC source $V_{DC}$ and consists of a switching device Qx, a diode Dx, a coil Lx, a smoothing capacitor Cx and a driver circuit Gx of the switching device Qx. The switching device Qx is subjected to on/off operation by the driver circuit Gx. By this driving, the pulse duty factor of the switching device Qx is regulated. Thus, the current or the wattage which is supplied to the discharge lamp 10 is controlled.

The full bridge circuit 2 is comprised of switching devices Q1 to Q4, such as a transistor or a FET, which are connected in the manner of a bridge, and of driver circuits G1 to G4 of the switching devices Q1 to Q4. There are also cases in which diodes are connected anti-parallel to the switching devices Q1 to Q4 which are in parallel. However, the diodes are omitted in this embodiment.

The above described switching devices Q1 to Q4 are driven by the driver circuits G1 to G4 via a control element (not shown).

By supplying an alternating current with rectangular waves to the discharge lamp 10, the full bridge circuit 2 is operated. This means that the switching devices Q1, Q4 and the switching devices Q2, Q3 are repeatedly switched on and off in alternation. For the ON state of the switching devices Q1, Q4, the current flows in the sequence from the voltage reduction chopper circuit 1 to the switching device Q1 to the coil L1 to the discharge lamp 10 to the switching device Q4 to voltage reduction chopper circuit 1. On the other hand, when the switching devices Q2, Q3 are ON, the current flows from the voltage reduction chopper circuit 1 to the switching device Q3 to the discharge lamp 10 to the coil L1 to the switching device Q2 to the voltage reduction chopper circuit 1, an alternating current with rectangular waves being supplied to the discharge lamp 10.

When driving the above described switching devices Q1 to Q4, to prevent simultaneous switching-on of the switching devices Q1 to Q4, there is a time (dead time Td) when the polarity of the rectangular alternating waves in which all switching devices Q1 to Q4 are turned off is switched.

The frequency of the output of the rectangular alternating waves which are supplied to the discharge lamp 10 is selected from the range from 60 Hz to 1000 Hz (steady-state frequency) and is, or example, 200 Hz. The duration of the above described dead time is selected from the range from 0.5 µs to 10 µs.

The device of the invention for operating the high pressure discharge lamp is characterized in that a lower frequency than the steady-state frequency (60 Hz to 1000 Hz), with a length of one half period to 5 periods and with an interval from 0.1 sec to 120 sec, is inserted by operating the discharge lamp shown in FIG. 1 with the steady-state frequency (60 Hz to 1000 Hz) using the feed device which is shown in FIG. 3.

Figure 4:
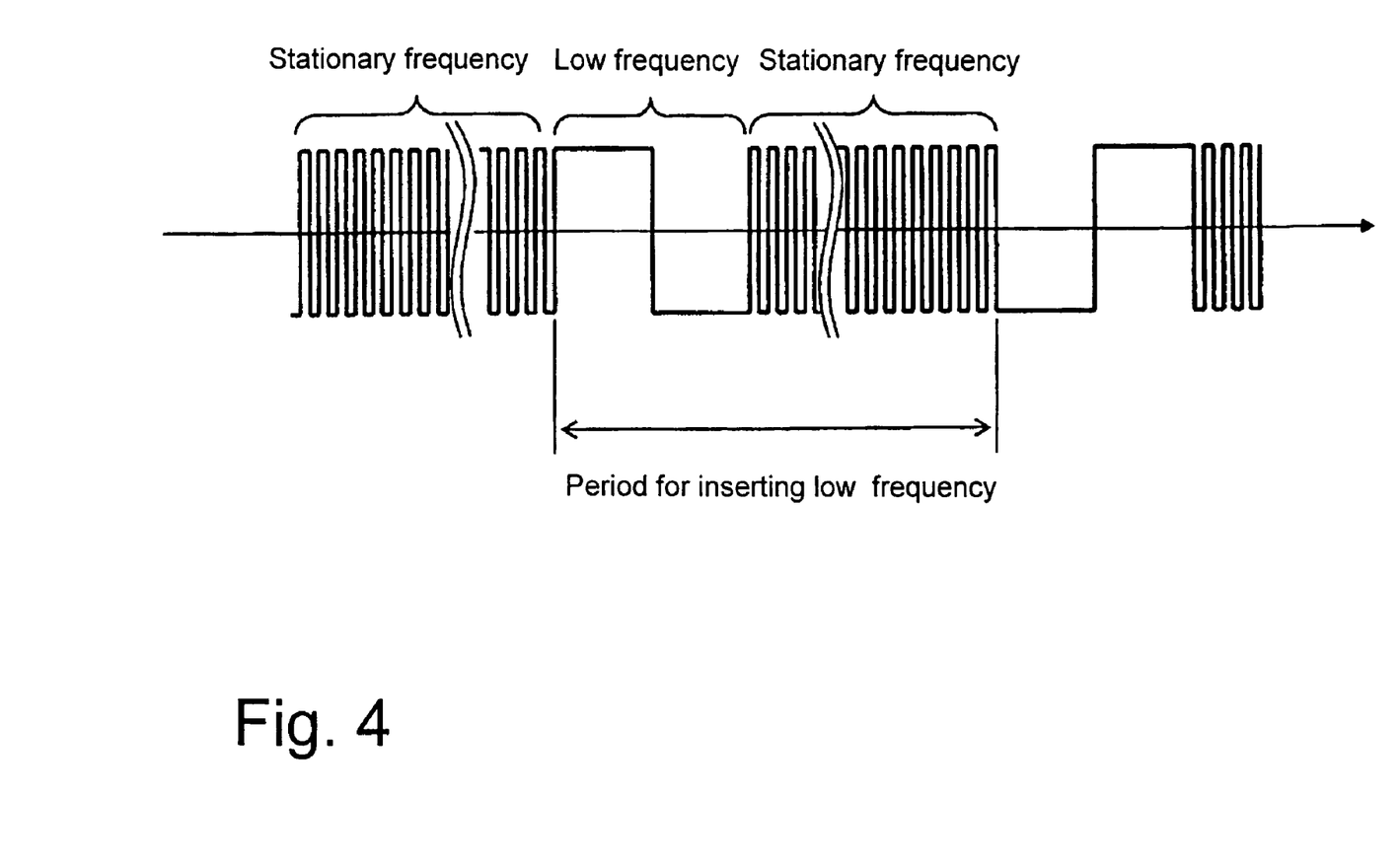
FIG. 4 is a schematic representation of the current waveform of a discharge lamp according to the invention.

FIG. 4 shows the current waveform of the discharge lamp 10. In the drawings, the Y axis plots the current value, and the x-axis plots the time.

As is shown in FIG. 4, the current waveform of the discharge lamp during operation with the steady-state frequency, for example, with 200 Hz, is driven intermittently with a lower frequency than the steady-state frequency, for example, with 10 Hz. This low frequency is a frequency which is selected from the range of from 5 Hz to 50 Hz, and occurs periodically with an interval from 0.1 sec to 120 seconds, preferably 1 sec to 120 seconds. This interval with which the low frequency is inserted, in the drawings, is the time which is called the period for inserting the low frequency. It is defined as the time interval between the time event in which an individual low frequency waveform begins up to the time event in which the next low frequency waveform begins. The length of the insertion of operation with a low frequency is not limited to one period, as is shown in FIG. 4, but is selected from a duration of at least one half period to at most 5 periods, as is described below.

The frequency (5 Hz to 50 Hz) of the above described low frequency, the length of the insertion (half period up to 5 periods) and the interval of insertion (0.1 sec to 120 sec) are selected in conjunction with construction of the discharge lamp, especially with the thermal construction of the electrode.

One example is named below.

At a rated wattage of the discharge lamp of 120 W:
the steady-state frequency is 90 Hz;
the frequency of the low frequency is 5 Hz;
the period for insertion is 1 frequency and
the insertion duration is 15 seconds (operating example 1).

At a rated wattage of the discharge lamp of 150 W:
the steady-state frequency is 125 Hz;
the frequency of the low frequency is 5 Hz;
the period for insertion is 1 frequency and
the insertion duration is 15 seconds (operating example 2).

At a rated wattage of the discharge lamp of 200 W:
the steady-state frequency is 200 Hz;
the frequency of the low frequency is 7.5 Hz;
the period for insertion is 1 frequency and
the insertion duration is 10 seconds (operating example 3).

At a rated wattage of the discharge lamp of 250 W:
the steady-state frequency is 400 Hz;
the frequency of the low frequency is 15 Hz;
the period for insertion is 1 frequency and
the insertion duration is 0.1 seconds (operating example 4).

At this point, the technical advantages and effects are described which arise by the periodic insertion of operation with the low frequency into operation with the steady-state frequency. That, in the discharge lamp of the invention, the formation of projections on the electrode tips, in the sense of enabling the stabilization of the arc, is advantageous has already been described.

However, if it is only control in which only projections are produced, there are cases in which, besides the actually required projections, superfluous projections are formed. In the control according to the invention, in which operation with a low frequency is inserted into operation with the steady-state frequency, it is simply a matter of preventing the production of these superfluous projections.

Figure 5A:
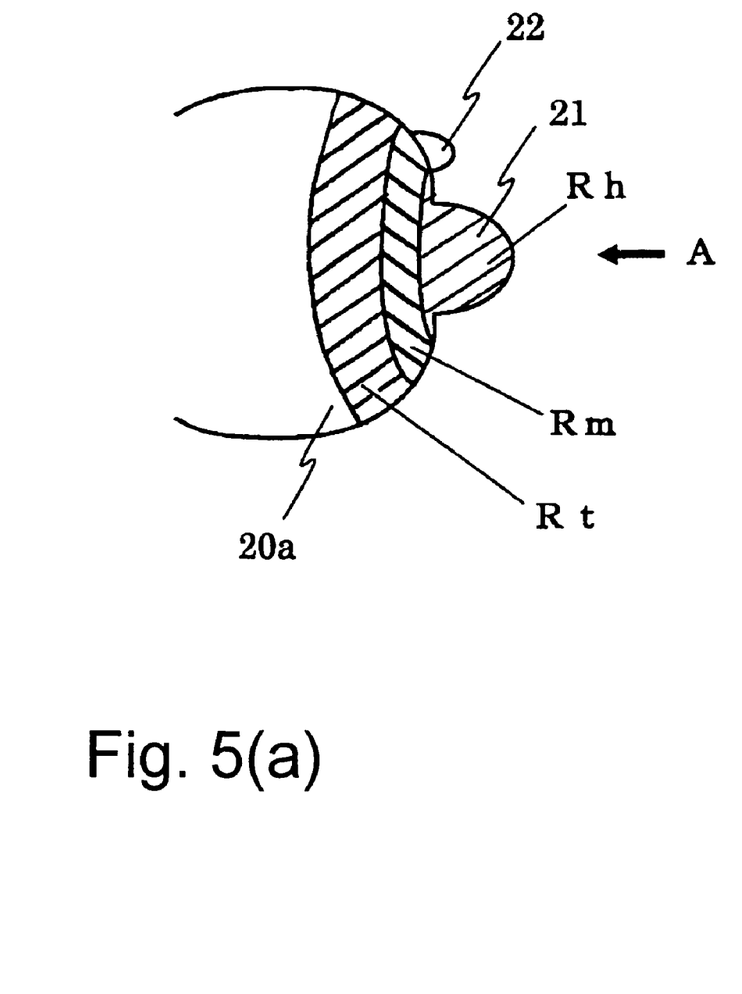
FIGS. 5(a) & 5(b) each schematically shows an enlarged view of an electrode for use in describing the invention.
Figure 5B:
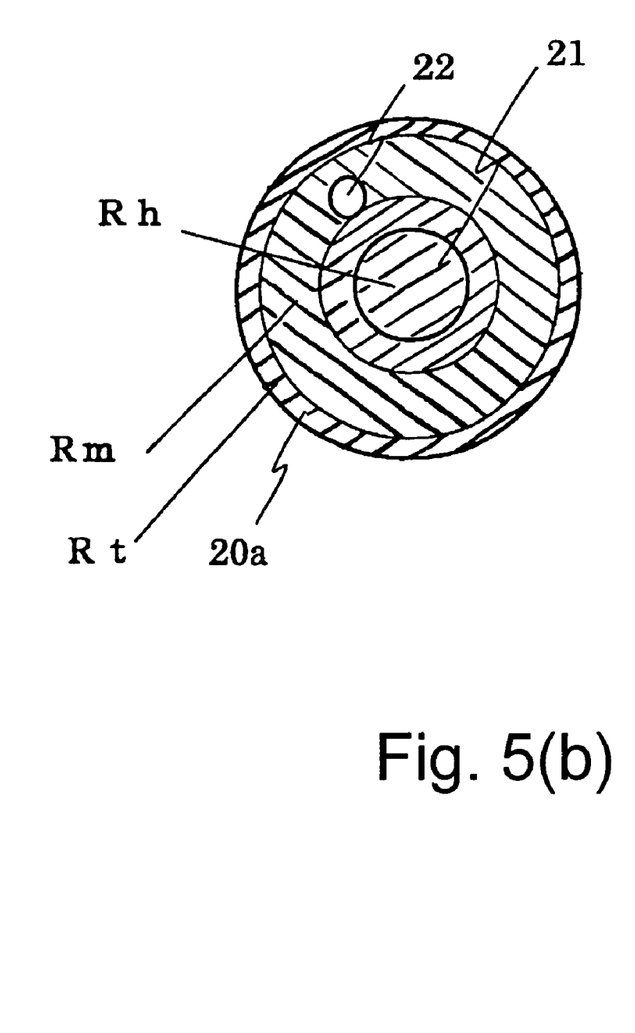

FIGS. 5(a) & 5(b) are each a comparison representation for description of the invention. They each schematically show an unwanted state which is formed in the case in which the frequency control of the invention is not carried out.

When the lamp is being operated, on the tip center of the spherical part 20a of the electrode, a projection 21 (the first projection) is formed. This projection 21 is a projection which acts as a discharge starting point and is necessary for stabilization of the arc. In the case in which the control in accordance with the invention is not carried out, in the course of continued operation of the lamp, in the vicinity of the projection 21, another projection 22 is formed (the second projection). This projection 22 is a projection which is actually unnecessary and which causes the disadvantage of so-called flickering by movement of the discharge start point between the projection 21 and the projection 22. The second projection is not always present alone, but there are also cases in which a host of second projections are formed.

The phenomenon that unnecessary projections (second projections 22) are formed and grow is described below.

On the electrode surface, during operation of the discharge lamp, there is a temperature distribution. The temperature is highest in the tip area and is lower, the closer the rear area is approached.

In the high temperature range in the vicinity of the electrode tip, by vaporizing the tungsten and by vaporizing the tungsten oxide, such as WO, $WO_2$ and the like, which is produced by a reaction with the oxygen which has remained in the discharge vessel, the electrode surface is eroded. As was described above, on the electrode tip which constitutes the discharge start point, due to the high vapor density of the tungsten in the arc precipitation and accumulation of the tungsten and formation of the above described first projection take place.

On the other hand, in the area with a low temperature of the electrode surface, by vaporization of WBr, $WBr_2$, $WO_2Br$, $WO_2Br_2$ and the like, which are produced by a reaction with the bromine which has been added to the discharge vessel and with the oxygen which has remained, the electrode surface is likewise eroded.

The tungsten compounds which vaporize differ depending on the temperature of the electrode surface. However, both the high temperature area of the electrode surface and also the area with the low temperature are eroded.

In the temperature range between the above described high temperature area and the area with the low temperature of the electrode surface the above described tungsten compounds are produced only to a minor extent due to the thermochemical properties of tungsten. The electrode surface is therefore eroded only to a small degree. Rather precipitation and accumulation of the tungsten vapor which is present in the discharge vessel are dominant. The above described second projection forms and therefore grows.

According to the invention, the first projection is thus essential. It must be maintained without causing it to disappear. The second projection is however unnecessary. It must be caused to disappear.

The frequency control of the invention causes the above described second projection to disappear. The mechanism which produces this effect is described below.

If the discharge lamp is subjected to rated operation with a frequency from 60 Hz to 1000 Hz, in the above described middle temperature area of the electrode surface, formation of the second projection begins. If, in doing so, switching to a lower frequency than the frequency of rated operation takes place, the temperature rises on the electrode tip due to a long anode operating time during the time during which operation as an anode takes place. This temperature increase is routed into the middle temperature region in which the second projection forms. In order to increase the temperature of the electrode surface in this area, vaporization, erosion, and disappearance of the second projection which had begun to form take place.

To suppress the formation and growth of the second projection, here a change of the temperature of the electrode surface over time is very important. If for example by reducing the electrode dimensions overall the temperature of the electrode surface is also set high, at most a displacement of the position at which the second projection forms and grows to the rear in the electrode takes place and its formation and growth cannot be suppressed. The invention is based specifically on the idea that the temperature of the electrode surface changes with a suitable time interval, that thus the formation of the second projection at a certain position is prevented and that in this way its formation is suppressed.

In the case in which the low frequency which is to be inserted is less than 5 Hz, in which the interval to insertion is less than 0.1 second, or in which the low frequency is inserted for over five periods, the temperature increase of the electrode tip becomes too great. In doing so, not only the second projection, but also the first projection which is essential for the super-high pressure discharge lamp disappears.

Conversely, in the case in which the low frequency to be inserted exceeds 50 Hz or in which a low frequency of less than one half period is inserted, a sufficient temperature increase is not obtained in the middle temperature area in which the second projection forms. Here, the formation and growth of the second projection cannot be suppressed. In the case in which the interval of insertion exceeds 120 seconds, the second projection also grows during rated operation by inserting the low frequency to the extent it is not longer being worn off.

The specific means for insertion of operation with a low frequency can be achieved by controlling the operating periods of the switching devices Q1 to Q4 of the full bridge circuit 2 in the circuit arrangement shown in FIG. 3.

Figure 6A:
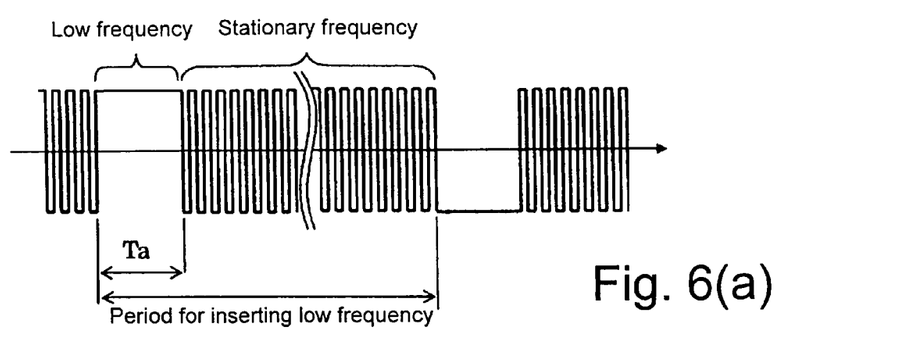
FIGS. 6(a) to 6(c) each schematically shows another version of the current waveform of the discharge lamp of the invention and FIGS. 7(a) & 7(b) each schematically shows one example of the electrode dimensions of a discharge lamp in accordance with the invention.
Figure 6B:
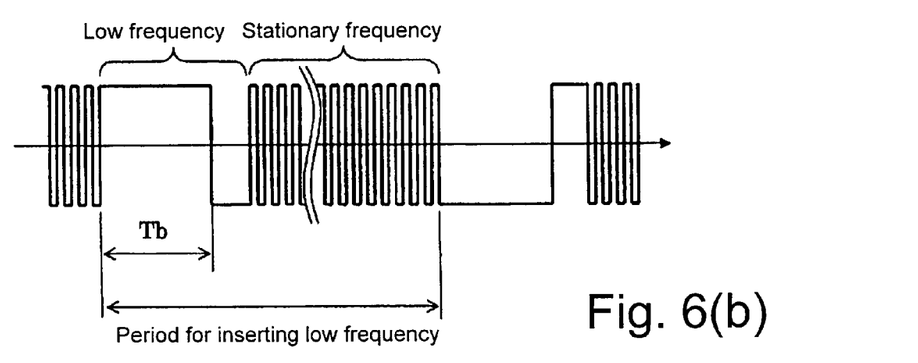
Figure 6C:
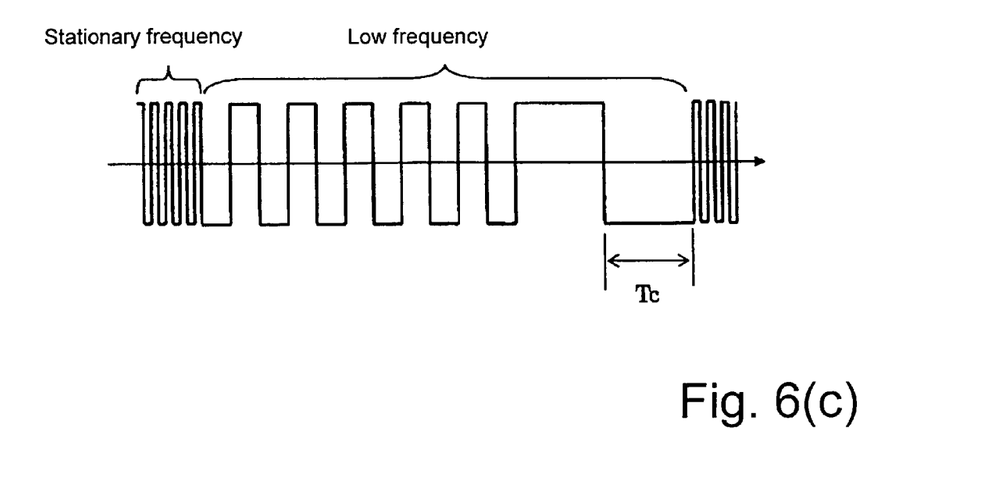

FIGS. 6(a) to 6(c) each show the waveform of the current which is flowing in the discharge lamp and which differs from the current waveform shown in FIG. 4.

FIG. 6(a) shows a case in which the current waveform with the low frequency is inserted for one half period. In this case, in the period for insertion of the low frequency, the operation of one of the electrodes as an anode is continued. Therefore, the period for insertion of the low frequency is interpreted such that the time Ta shown in FIG. 6(a) is defined as the length of the half period. In the case of insertion of operation with the low frequency with such a half period, it is advantageous to insert with a different polarity than in the preceding insertion.

FIG. 6(b) shows the case in which the current waveform of the low frequency is greater than a half period and less than one period. In this case, the time in which the duration for fixing the current polarity is long can be defined as a half period. This means that it can be interpreted that in FIG. 6(b) the time Tb is defined as the length of the half period and that in FIG. 6(b) a low frequency current has been inserted for a time with a ¾ period. The reason for definition of the time in which fixing of the polarity lasts a long time as the half period is that there is the action that the second projection disappears by the temperature increase of the electrode surface during this time. If operation is inserted with a low frequency which is greater than such a half period and is less than one period, it is desirable for insertion to be done such that the polarity changes in alternation with a longer time. The reason for this is that the temperature of the two electrodes can be increased in a uniform manner.

FIG. 6(c) shows a configuration in which, when operation with a low frequency is inserted, the frequency differs (changes). In this case, the insertion cycle (how many percent have been inserted) is defined by the lowest frequency. It can be interpreted that, in FIG. 6(c), a time Tc is defined as the half period and that one period of low frequency has been inserted. The reason why the waveform of the lowest frequency is defined as the low frequency is that, during the time for insertion of this frequency, the time for fixing the polarity becomes longest and that, thus, the effect of the temperature increase of the electrode tip can be developed.

The above described definitions were made to prevent the insertion state (the configuration) of the low frequency as the current waveform from becoming unclear. It can be stated that the definitions were made to determine the insertion time and the insertion cycle of the low frequency.

The discharge lamp in accordance with the invention is characterized by provision of an amount of added mercury that is at least 0.2 mg/mm$^3$. Testing of the invention confirmed that the effect of mercury vapor during operation on the arc is small if the amount of added mercury is less than 0.2 mg/mm$^3$, specifically 0.18 mg/mm$^3$. This means that, in the case of an amount of added mercury of roughly 0.18 mg/mm$^3$, the arc does not fluctuate even if the surface of the electrode tip is smooth (without a projection and the like). However, if the amount of added mercury is at least 0.2 mg/mm$^3$, the action of the constriction of the arc by the vapor pressure during lamp operation become conspicuously great. In this way, the phenomenon occurs that the arc is moving (fluctuating).

One important idea lies in the recognition of the necessity of forming the projection on the electrode tip for stabilization of the arc in a discharge lamp which is filled with at least 0.2 mg/mm$^3$. It can be stated that a major feature of the invention is that, under the assumption that on the electrode tip there is a projection, for prevention of formation and growth of unnecessary projections, operation with a given low frequency has been inserted.

In the circuit of the feed device shown in FIG. 3, it is advantageous that, in the device of the invention, for operating a high pressure discharge lamp, the inductance of the coil L1 which is located downstream of the inverter circuit of the full bridge type 2 and which is series-connected to the discharge lamp is fixed at a value that less than or equal to 210 μH. The reason for this is that, in the dead time of the switching devices Q1 to Q4 of the full bridge circuit 2, the decrease of the light intensity of the discharge lamp can be reduced.

This effect, in one respect makes sense in that, both in the type using a liquid crystal cell and also in the type using DLP, a fluctuation of the light intensity which occurs over time can be suppressed. In particular, in the case of a DLP type, the polarity of the discharge lamp can be changed without attempting synchronization with driving of the DMD element, the rotary filter and the like. The insertion of operation with low frequency into operation by the steady-state frequency according to the invention therefore has a major effect in the regard that, from the standpoint of the control of the projection, free implementation is possible.

The starter circuit 3 is formed of a resistor R1, a switching device Q5, a capacitor C2, a high voltage transformer T2 and a driver circuit G5 for the switching device Q5. Since the input point on the high voltage side and the input point on the low voltage side of the starter circuit 3 are connected in parallel to the discharge lamp 10, the same voltage as the voltage which has been applied to the discharge lamp 10 is also supplied to the starter circuit 3. When this applied voltage is received, the capacitor C2 is charged via the resistor R1 in the starter circuit 3.

The switching device Q5 is comprised of an SCR thyristor or the like. If the switching device Q5 is closed by the driver circuit G5, on the primary winding of the high voltage transformer T2, a charging voltage of the capacitor C2 is formed, and on the secondary winding a trigger voltage for insulation breakdown forms.

Here, it is desirable that, in the device of the invention for operating a high pressure discharge lamp, there is a trigger electrode on the outside of the discharge vessel. This means that a type is not used in which the high voltage is produced between the electrodes of the discharge lamp when operation starts (hereinafter "outside trigger type"). In the circuit shown in FIG. 3, one end of the secondary winding of the high voltage transformer T2 is located as the trigger electrode Et on the outside surface of the discharge lamp 10. The other end of the secondary winding is electrically connected to one of the electrodes of the discharge lamp 10.

This circuit is advantageous in the respect that the transformer T2, for producing a high voltage which is necessary when operation starts, is not present in the path of current feed during rated operation after starting of operation, because the coil L1, as the sum of the inductance for the current loop which is formed during rated operation, can be made smaller.

When operation of the discharge lamp 10 starts, if a trigger voltage is produced by this circuit, between the trigger electrode Et and the electrodes in the discharge vessel, a so-called dielectric barrier discharge forms which takes place through silica glass (material of the discharge vessel). If plasma is formed by this dielectric barrier discharge in the discharge vessel, a discharge is formed in the discharge vessel between the first electrode and the second electrode by a previously applied no-load voltage, this plasma acting as the initiator.

The trigger voltage is 5 kV to 20 kV, for example, 13 kV. The no-load voltage is 250 V to 400 V, for example, 350 V.

Here, strictly speaking, the inductance is not only the coil L1, but the sum of the inductance in the current loop which is formed during rated operation of the discharge lamp 10. However, it is representatively determined by the inductance of the coil L1. In the invention, therefore, the numerical values are fixed with consideration of the inductance of the coil L1. Thus, the numerical values of the inductance are fixed more preferably by the sum of the inductance for the current loop in rated operation, i.e., for the capacitor Cx, the full bridge circuit 2, the coil L1, the discharge lamp 10, the full bridge circuit 2 and the capacitor Cx. From the standpoint of a practical effect, however, the coil L1 is subjected to fixing of numerical values.

The coil L and the capacitor C1 in steady-state operation of the lamp are necessary to prevent noise. It is desirable that a value of at least 0.15 μH is present.

FIG. 3 illustrates the full bridge circuit 2 using a circuit which has four switching devices. However, the invention is not limited to this configuration, and other circuit arrangements can also be used. For example, the number of switching devices need not be four. It is enough if at least two switching devices can carry out ON-OFF operation in alternation with a dead time in between. Also, the voltage reduction chopper circuit is not an essential material component, but another type of circuit can also be used as a means for regulating the amount of current.

For the capacitor Cx which is present in the voltage reduction chopper circuit, an arrangement can be undertaken in which when operation begins and during steady-state operation the capacitance changes. It is possible that, in this arrangement, for example, several capacitors are connected to one another in parallel and that the circuit arrangement is switched by the switching devices.

Figure 7A:
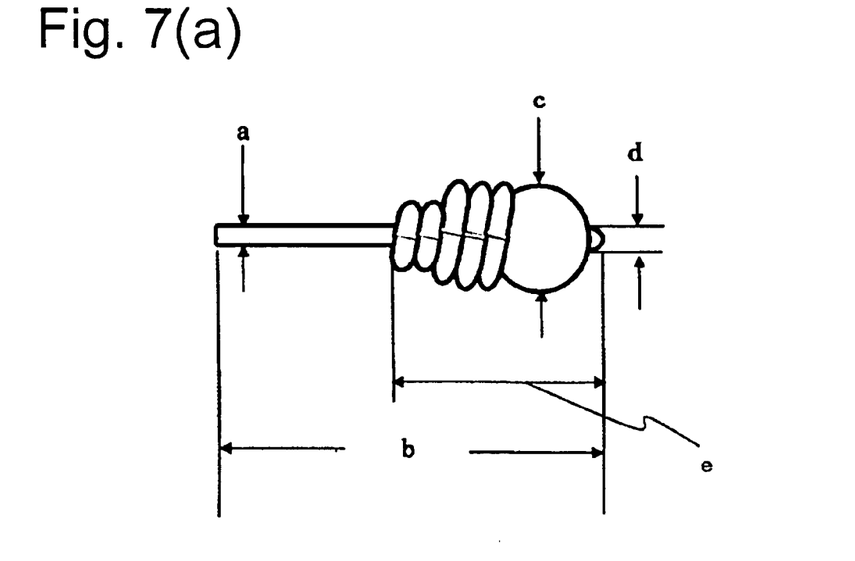
Figure 7B:
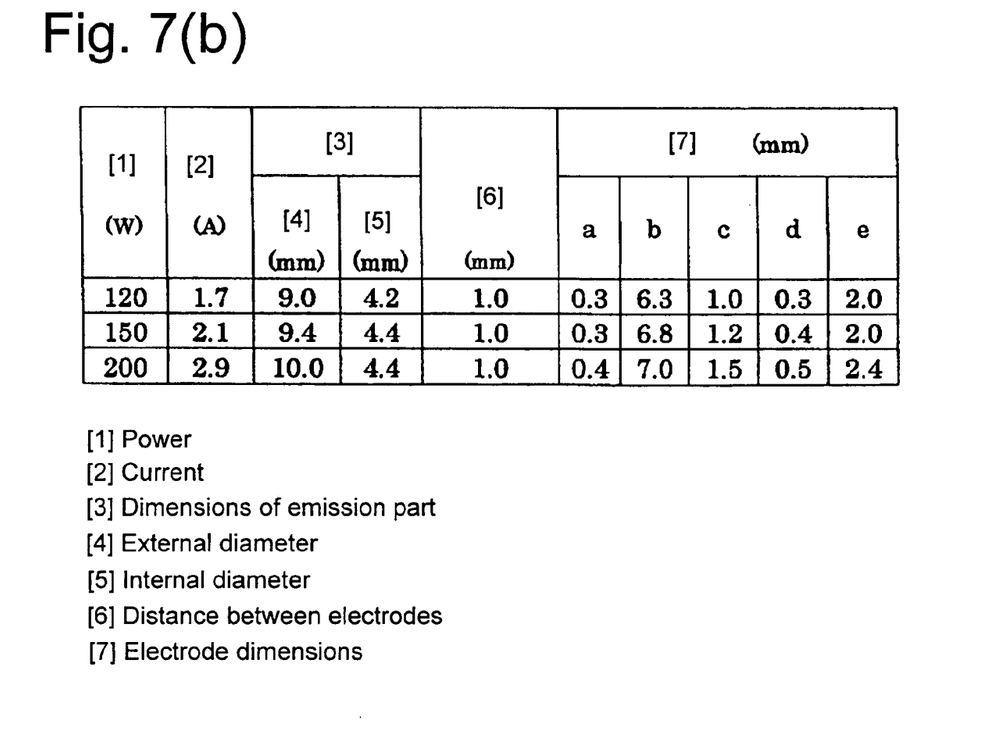

FIGS. 7(a) & 7(b) show the relation between operating control by the device of the invention for operation of a high pressure discharge lamp and the electrodes. FIG. 7(a) shows an enlarged view of the electrode and FIG. 7(b) shows specific numerical values for the parts of the electrode with respect to the operating examples 1 to 3 which were described above. As the dimensions of the light emitting part, the maximum outside diameter in the direction which is perpendicular to the discharge direction of the light emitting part 11 which is shown in FIG. 1 is designated the external diameter value [4] and the maximum inside diameter is labeled the internal diameter value [5]. The examples of numerical values are only one example and do not limit the technical characteristics of the invention.

The invention claimed is:

1. Device for operation of a high pressure discharge lamp, comprising:
 a super-high pressure discharge lamp having a silica glass discharge vessel in which a pair of opposed electrodes, with projections which have been formed on the their tips, are disposed with a distance between them of at most 2.0 mm, and the vessel being filled with at least 0.20 mg/mm$^3$ of mercury and with a halogen in an amount of $10^{-6}$ μmol/mm$^3$ to $10^{-2}$ μmol/mm$^3$; and
 a feed device which supplies an alternating current to the discharge vessel,
 wherein the feed device is adapted to supply alternating current to the super-high pressure discharge lamp with both a steady-state operating frequency and a low frequency, the steady-state operating frequency being selected from the range from 60 Hz to 1000 Hz and the low frequency being lower than the steady-state operating frequency and being in the range of from 5 Hz to 50 Hz, and wherein the feed device is adapted to insert the alternating current with the low frequency into the alternating current with the steady-state operating frequency with a time interval which has a length of equal to at least one half period and at most equal to five periods, said time interval being in the range of from 0.1 sec to 120 sec.

2. Device for operation of a high pressure discharge lamp as claimed in claim 1, wherein the time interval is in the range of from 1 sec to 120 sec.

3. Device for operation of a high pressure discharge lamp as claimed in claim 1, wherein the feed device comprises:
 an inverter circuit which has at least two switching devices;
 a coil which is located downstream of the inverter circuit and is connected in series to the discharge lamp and which has a value of at most 210 μH; and
 a control element which subjects the switching devices to on or off operation in alternation with a dead time.

4. Device for operation of a high pressure discharge lamp as claimed in claim 1, wherein a trigger electrode is located on the outside of the discharge vessel.

5. Device for operation of a high pressure discharge lamp as claimed in claim 2, wherein the feed device comprises:
 an inverter circuit which has at least two switching devices;
 a coil which is located downstream of the inverter circuit and is connected in series to the discharge lamp and which has a value of at most 210 μH; and
 a control element which subjects the switching devices to on or off operation in alternation with a dead time.

6. Device for operation of a high pressure discharge lamp as claimed in claim 5, wherein a trigger electrode is located on the outside of the discharge vessel.

* * * * *